Figure 1:
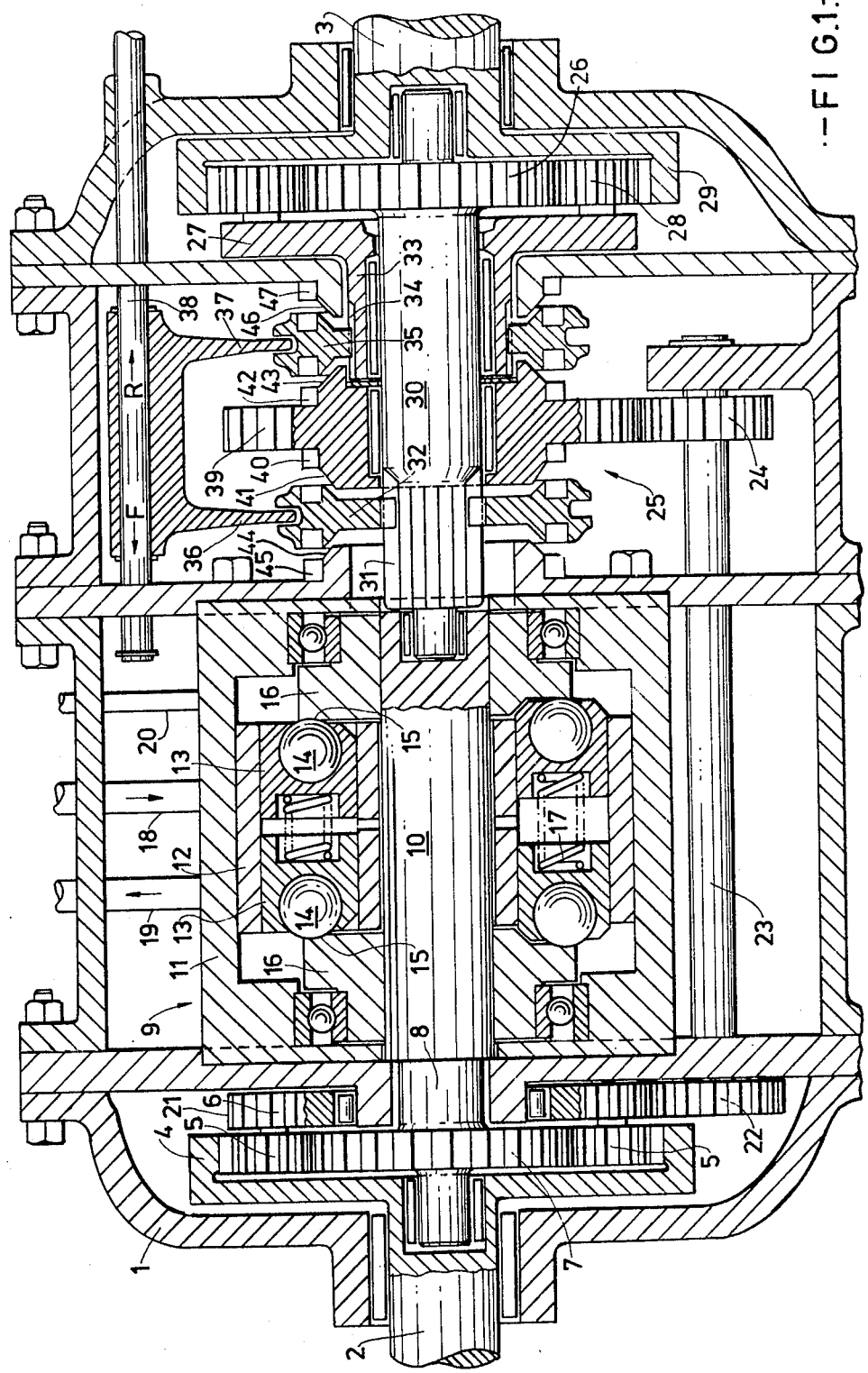

United States Patent [19]

Ward

[11] 4,084,451
[45] Apr. 18, 1978

[54] DRIVE-TRANSMITTING MECHANISMS

[76] Inventor: John Lionel Raymond Ward, Ivy Rock, Tidenham, Chepstow, Gwent, Wales

[21] Appl. No.: 748,890

[22] Filed: Dec. 9, 1976

[30] Foreign Application Priority Data

Jul. 2, 1976 United Kingdom ............... 50335/76
Jul. 23, 1976 United Kingdom ............... 27755/76
Jul. 23, 1976 United Kingdom ............... 30911/76

[51] Int. Cl.$^2$ .................. B60K 41/04; F16H37/06
[52] U.S. Cl. .................. 74/867; 74/665 GA
[58] Field of Search .................. 74/865, 867, 665 GA

[56] References Cited

U.S. PATENT DOCUMENTS 3,455,184 7/1969 Frandsen et al. .................. 74/867 X
3,842,694 10/1974 Marlow .................. 74/865 X Primary Examiner—Leonard H. Gerin
Attorney, Agent, or Firm—Young & Thompson

[57] ABSTRACT

A drive-transmitting arrangement for use in a motor vehicle, fork-lift truck or industrial machinery includes a differential or epicyclic gear assembly having an input member and two output members. One of the output members is connected, directly or indirectly, to the operating element of a hydraulic pump so as to drive the pump and the outlet line of the hydraulic pump contains a control valve which may be responsive to the parameters of an engine connected to the input member of the gear assembly. Adjustment of the setting of the valve means varies the resistance to movement of the pump operating element so as to vary the ratio of the gear assembly.

13 Claims, 7 Drawing Figures

-FIG.2.-

DRIVE-TRANSMITTING MECHANISMS

This invention relates to drive-transmitting arrangements and has for its object the provision of improved means for controlling the rate of rotation of the output member or members of a drive system.

According to one aspect of the invention there is provided a drive-transmitting arrangement comprising a gear assembly, for example, a differential or epicyclic gear assembly, having an input member and two output members wherein one of the output members is connected to the operating element of a hydraulic pump and valve means is provided in the outlet line of the hydraulic pump, which valve means is adjustable to adjust the resistance to movement of the operating element of the hydraulic pump and thereby to adjust the ratio between the rates of rotation of the input member and of the other output member.

The differential or epicyclic gear assembly may be of any standard form including, for example, intermeshing bevel or worm gears with the arrangement such that the ratio between said rates of rotation is variable in a controlled manner between one limiting value corresponding to the valve means being fully open and another limiting value corresponding to the valve means being fully closed. Indicator means may be provided for indicating the setting of the valve means and/or the selected ratio. Such a system may be used for controlling the speed of, for example, a machine tool spindle or a motor vehicle.

The side of the valve means away from the outlet of the hydraulic pump is preferably connected to a reservoir to which the inlet side of the hydraulic pump is connected.

As applied to a transmission for a road vehicle, the input member of the drive-transmitting arrangement will be connected to the output shaft of the vehicle engine and the output member will be connected to the propellor shaft of the vehicle. Control means is preferably provided controlling the degree of opening and closing of the valve means.

In operation, the degree of resistance to the hydraulic flow delivered by the pump will determine the rate of rotation of the output member of the drive-transmitting arrangement for a given rate of rotation of the input member and a given load applied to said output member. As a result, the rate of rotation of the output member will be determined as also will be the reaction torque transmitted thereto. This reaction torque is the equivalent of a controlled load applied to said one output member of the gear assembly and the ratio of the rate of rotation of said other output member to the rate of rotation of the input member will be dependent on this applied load.

Preferably the supply and delivery lines of the hydraulic pump are connected to a directional control valve having a valve member the position of which is adjustable in response to operation of switch means actuated independence on the position of a throttle. There may be provided a boost pump between the directional control valve and the reservoir, the directional control valve being operable to direct the output of said boost pump to either side of said hydraulic pump.

The hydraulic pump may be an axial piston hydraulic motor arranged to pump hydraulic fluid around a closed loop from which leakage is permitted, with topping-up effected by means of the boost pump, a remotely-operated flow control valve being contained in said closed loop. Operation of the flow control valve may be effected by means of a pedal or other control which also controls operation of the engine throttle. A reverse mechanism may be provided and may comprise an epicyclic gear assembly with selectably engageable dogs.

Control means may be provided for use in obtaining the required setting of the valve means, which control means includes means for generating a first signal determined by, for example, the rate of rotation of the engine or by the setting of a throttle controlling operation of the engine, means for generating a second signal determined from the engine manifold pressure in the case of a spark ignition engine or determined by the rate of feed of fuel in the case of a diesel engine, a summator to which said first and second signals are applied and means controlling the setting of the valve means in dependence on the output of the summator.

In the case of a spark ignition engine, the engine manifold pressure is preferably measured by means of a transducer and the mode of operation of the summator is preferably such that the maximum output thereof is obtained in response to receipt of first and second signals the total value of which is less than the maximum possible total value of said first and second signals, said maximum output of the summator being maintained when the input thereto is between said specified total value and the maximum total value. The generated signals may be transmitted electrically, pneumatically or hydraulically, for example, fluid logic techniques can be employed.

Figure 2:
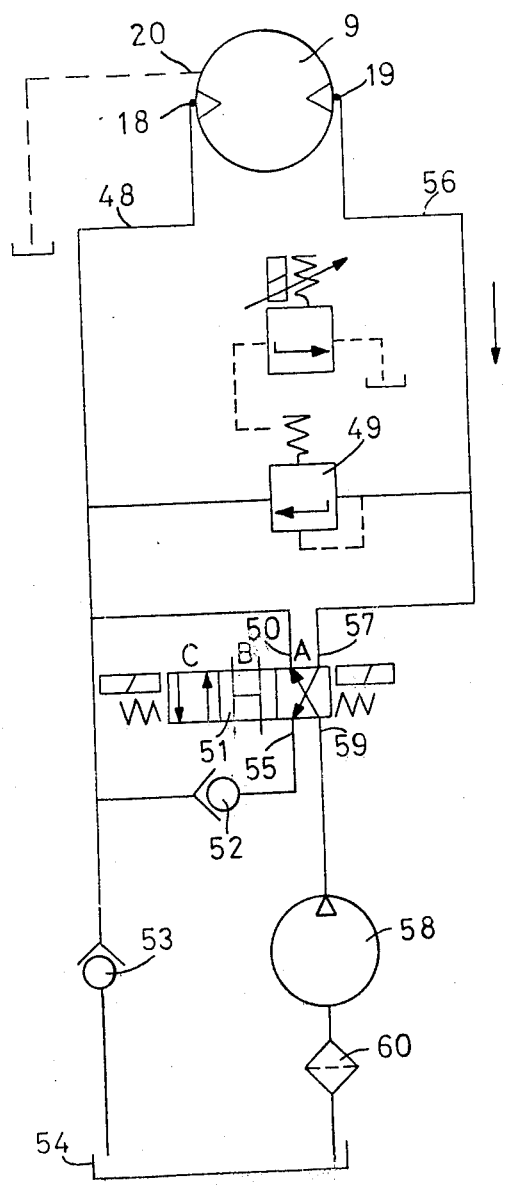
Figure 3:
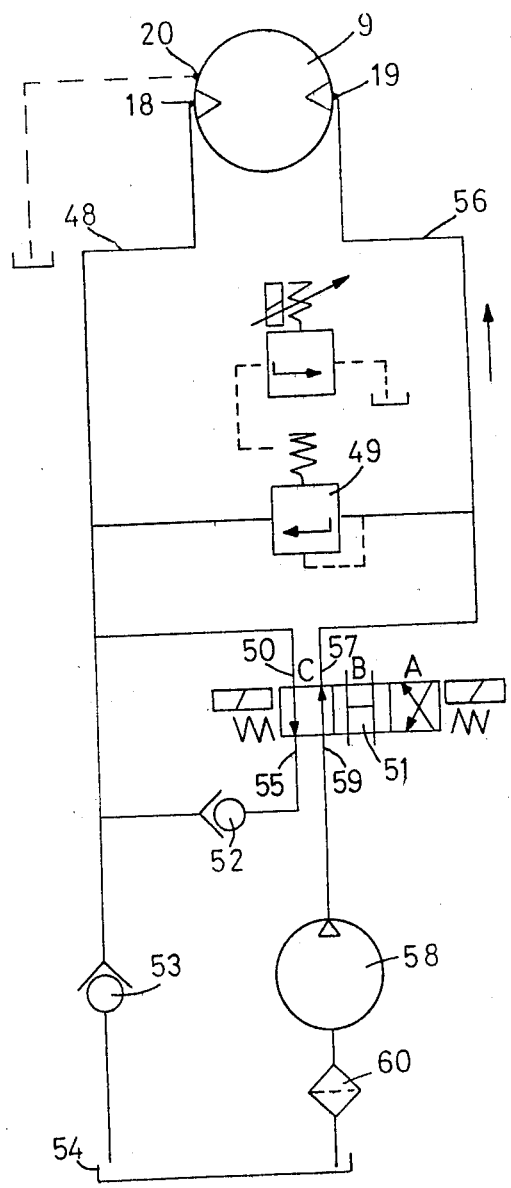
Figure 4:
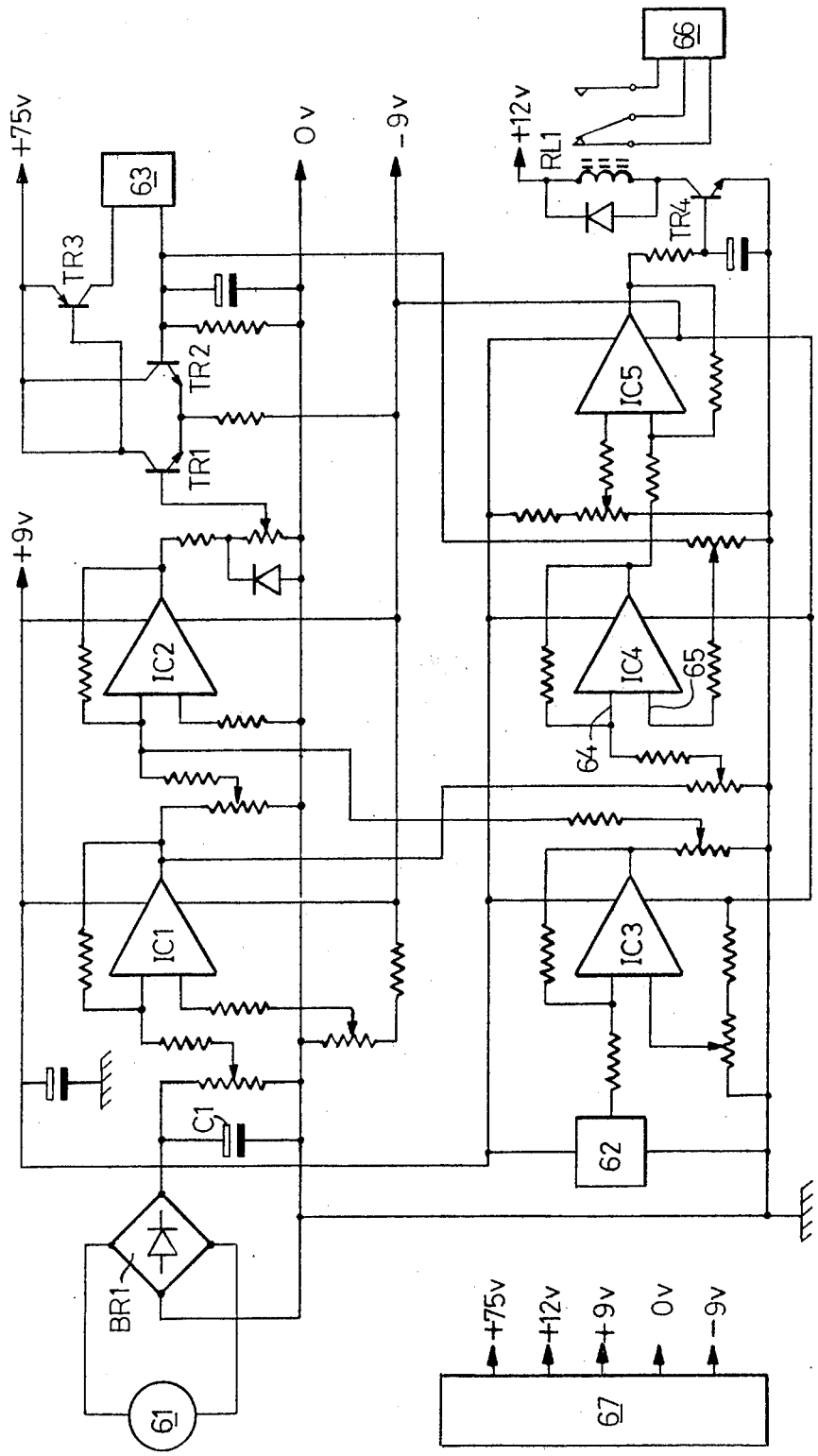
Figure 5:
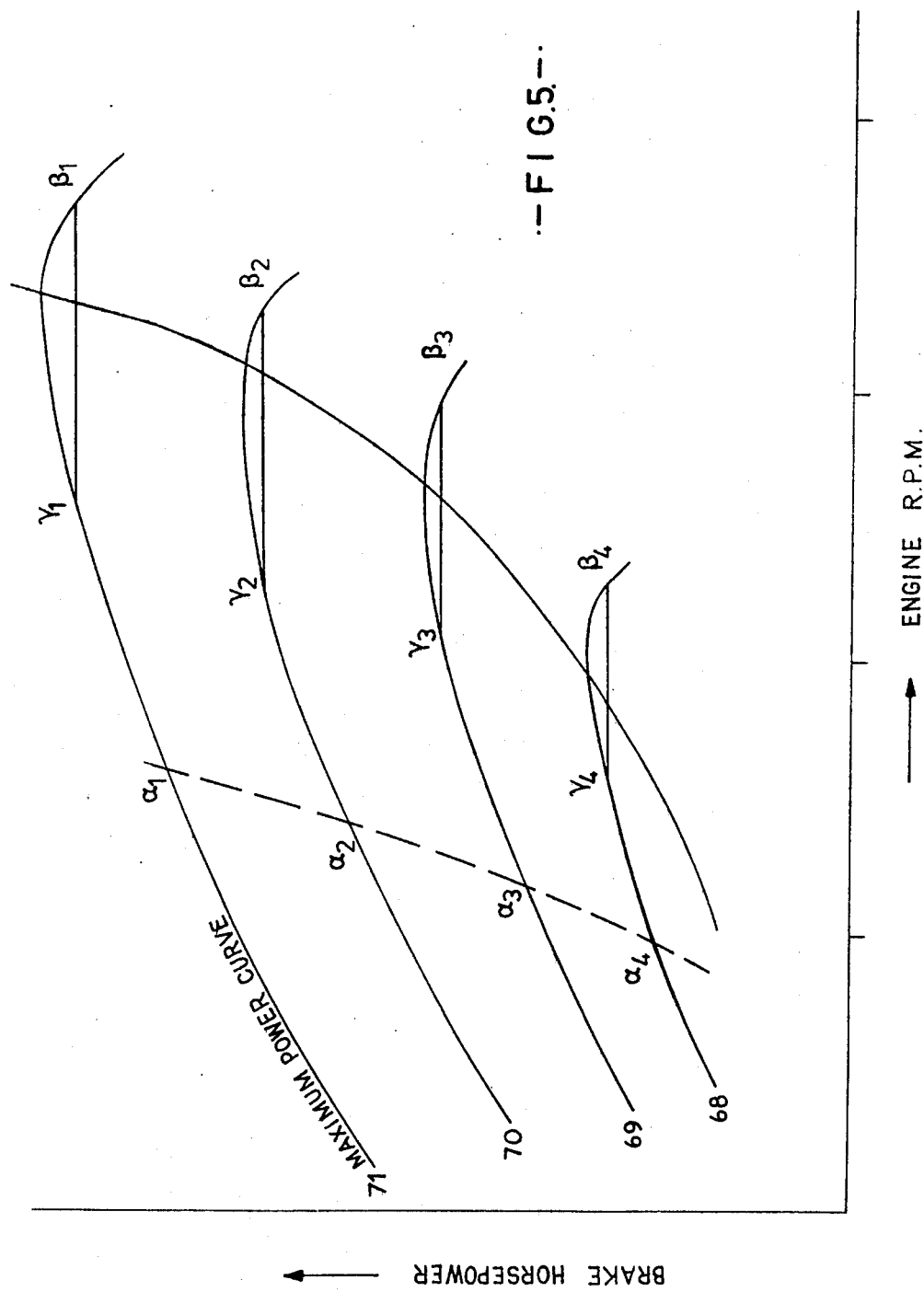
Figure 6:
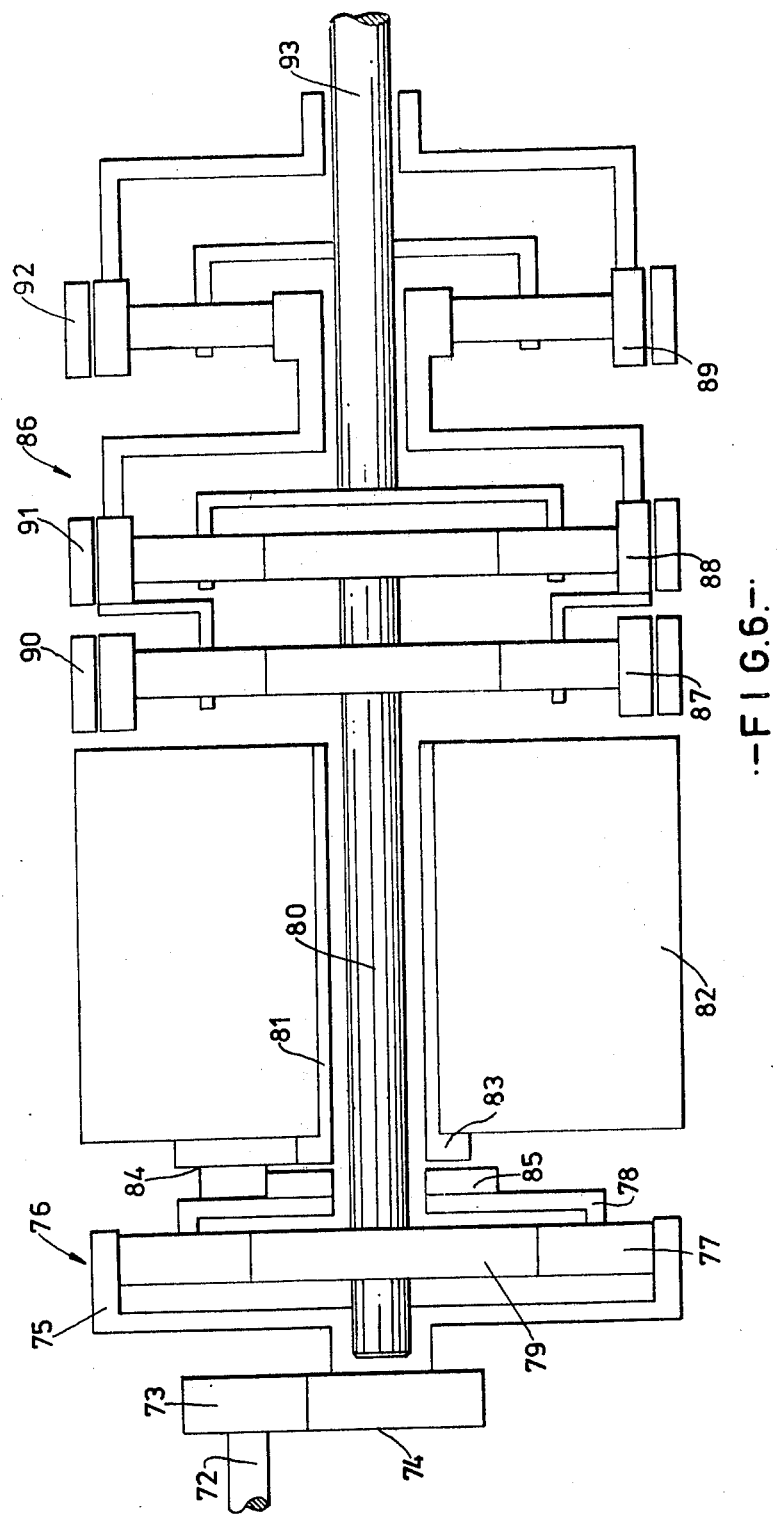
Figure 7:
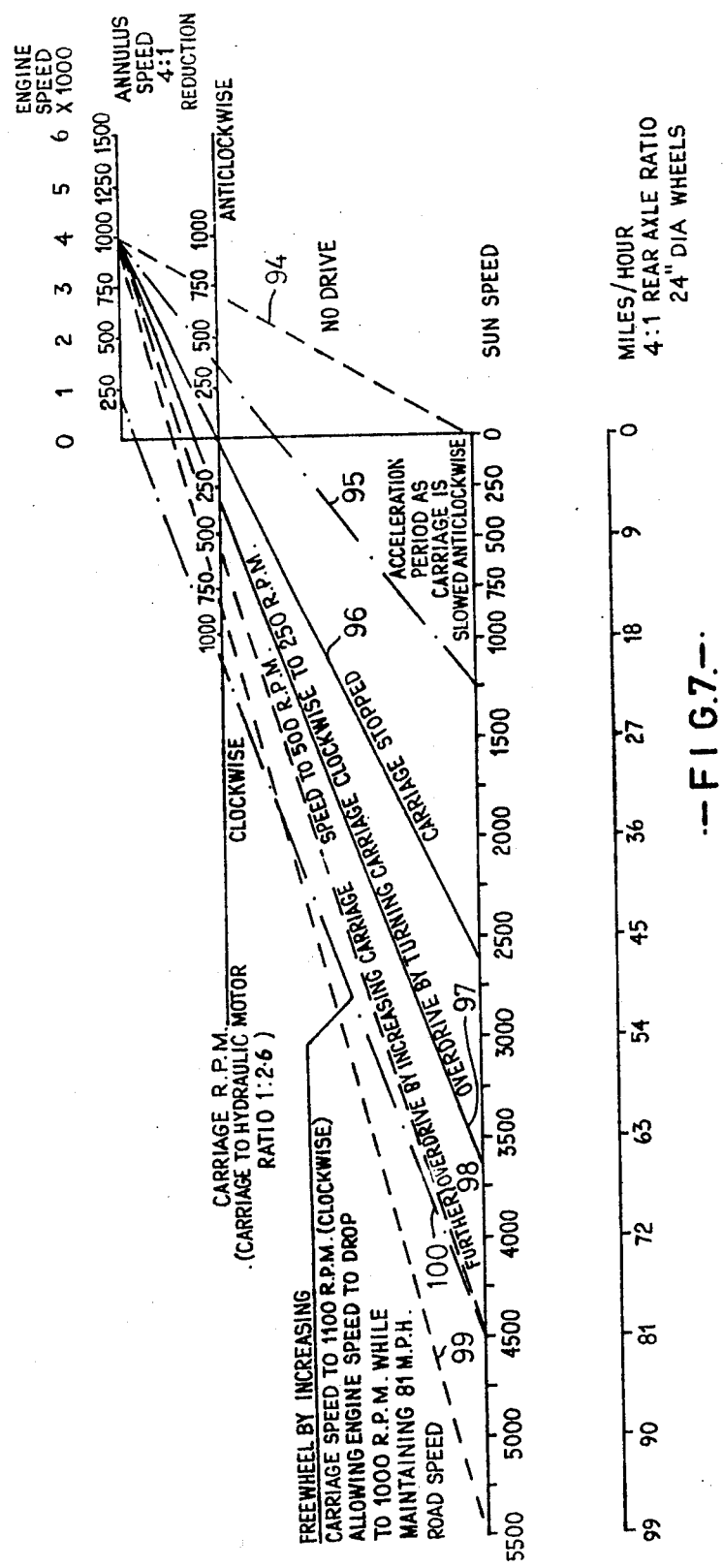

The invention will now be described, by way of example, with reference to the accompanying drawings, in which:

FIG. 1 is a sectional view of a first embodiment comprising a gear assembly and pump, FIGS. 2 and 3 show the hydraulic circuit in the drive and overdrive conditions respectively, FIG. 4 is a diagram of the electronic control circuit, FIG. 5 shows the relationship between engine r.p.m. and power for different throttle openings, FIG. 6 shows a second embodiment, and FIG. 7 shows the relationship between input, pump and output speeds for the embodiment of FIG. 6.

As shown in FIG. 1, the drive-transmitting arrangement includes an outer casing 1, a drive shaft 2 and an output shaft 3. The inner end of the drive shaft 2 carries an annulus gear 4 which cooperates with a plurality of planet gears 5 supported by a carriage 6. The planet gears 5 engage with a sun gear 7 attached to the shaft 8 of a reversible hydraulic pump 9.

The hydraulic pump 9 is of the axial piston type and may be of either fixed or variable displacement. A swashplate pump may be used for variable displacement. However, the pump described is of fixed displacement and is of known design comprising a rotor 10 rotatable within an outer casing 11. The casing 11 includes a plurality of axial cylinders 12 each containing two opposed piston/ball assemblies 13. The balls 14 of the piston/ball assemblies 13 are held in contact with inclined tracks 15 of a pair of multi-lobed cams 16 provided one towards each end of the shaft 8, each ball 14 being acted on by a compression spring 17 disposed between each pair of piston/ball assemblies 13. Three hydraulic connections comprising an inlet 18, an outlet 19 and a drain 20 are provided in the casing, the inlet 18 and the outlet 19 communicating with commutation ports (not shown) in the shaft 8. The spaces in the cylinders 12 between the piston/ball assemblies 13 communicate via the commutation ports alternatively with the inlet connection 18 and the outlet connection 19. Any leakage of hydraulic fluid from the cylinders 12 is bled from the casing by the drain connection 20.

The commutation ports and cam lobes are phased such that when, in operation, the piston/ball assemblies 13 of a cylinder 12 are forced inwardly by the cams 16, the cylinder 12 is in communication with the outlet 19, and when the piston/ball assemblies 13 are moving outwardly under the action of the springs 17 the cylinder 12 is in communication with the inlet 18. Thus hydraulic fluid is drawn in through the inlet 18 and forced out through the outlet 19. It is desirable for the pressure at the inlet 18 to be maintained somewhat higher than that at the drain 20, to provide hydraulic assistance for the springs 17 in maintaining the balls 14 in contact with the cams 16.

However, if the pressure at the inlet 18 is greater than that at the outlet 19, the pump 9 will act as a motor, the potential energy of the fluid supplied under pressure being converted into kinetic energy as a result of reciprocation of the piston/ball assemblies 13 and rotation of the cams 16. The torque output of the motor is dependent on the pressure difference between the inlet and the outlet and the speed of rotation is dependent on the fluid flow rate. Reversing of the motor can be effected substantially instantaneously by interchanging the supply and delivery connections, and freewheeling can be achieved by relieving the pressure in both the supply and delivery lines.

Around the circumference of the carriage 6 there are provided gear teeth 21 which engage with a gear wheel 22 mounted at one end of a shaft 23. At the other end of the shaft 23 there is a further gear wheel 24 engaging with a reversing mechanism 25. For high power applications, more than one shaft 23 may be provided, the shafts being distributed circumferentially around the carriage 6 and reversing mechanism 25. The reversing mechanism 25 includes an epicyclic gear assembly having a sun wheel 26, a planet gear carriage 27 carrying planet gears 28 and an annulus 29 mounted on the output shaft 3. The sun wheel 26 is mounted at one end of a shaft 30 which has splines 31 at its other end, a dog clutch member 32 being carried by the splines 31 for rotation with the shaft 30 and for axial movement relative thereto. The carriage 27 has an annular boss 33 through which passes the shaft 30 and around the circumference of which there are splines 34. A second dog clutch member 35 is mounted on the splines 34 for rotation therewith and for axial movement relative thereto. The first dog clutch member 32 cooperates with a selector fork 36 and the second dog clutch member 35 cooperates with a selector fork 37, the selector forks 36 and 37 being fixed to a selector rod 38 so that axial movement of the selector rod 38 moves the dog clutch members 32 and 35 along their respective splines 31 and 34. A gear wheel 39 is rotatably mounted on the shaft 30 between the dog clutch members 32 and 35 and engages with the gear wheel 24. On the side of the gear wheel 39 adjacent the dog clutch member 32 dog teeth 40 and a synchronizing cone 41 are provided and on the other side there are dog teeth 42 and a synchronizing cone 43.

In the position shown in FIG. 1, the reversing mechanism 25 is in a neutral condition. However, if the selector rod 38 is moved in the direction of the arrow F, the dog clutch member 35 engages with the synchronizing cone 43 and the dog teeth 42. At the same time, the dog clutch member 32 engages with a fixed synchronizing cone 44 and fixed dog teeth 45. Thus, when the input shaft 2 is rotating and drive is transmitted via the shaft 23 to the gear wheel 39, the carriage 27 rotates with the gear wheel 39 whilst the sun wheel 26 is held stationary, causing the output shaft 3 to rotate in the same direction as the input shaft 2. Conversely, if the selector rod is moved in the direction of the arrow R, the dog clutch member 32 engages with the synchronizing cone 41 and the dog teeth 40 whilst the dog clutch member 35 engages with a fixed synchronizing cone 46 and fixed dog teeth 47. The carriage 27 is then held stationary and the sun wheel 26 rotates with the gear wheel 39, resulting in rotation of the output shaft 3 in the opposite direction to the drive shaft 2.

As shown in FIG. 2, the inlet 18 of the pump 9 is connected to a hydraulic line 48 which is also connected to the outlet of a pilot-operated pressure relief valve 49, a connection 50 of a directional control or overdrive valve 51, the inlet of a check valve 52 and the inlet of a boost-pressure relief valve 53. The outlet of the boost-pressure relief valve 53 communicates with a hydraulic fluid reservoir 54, and the outlet of the check valve 52 communicates with another connection 55 of the overdrive valve 51. The outlet 19 of the pump 9 is connected to a hydraulic line 56 which is also connected to the inlet of the pilot-operated pressure relief valve 49 and a further connection 57 of the overdrive valve 51. A boost pump 58 has its outlet communicating with a fourth connection 59 of the overdrive valve 51 and its inlet communicating with the reservoir 54 via a filter 60. The overdrive valve 51 has three positions, indicated A, B, and C, producing drive, free-wheel and overdrive conditions respectively. In position A connection 50 communicates with connection 59 and connection 55 communicates with connection 57, whilst in position B all four connections intercommunicate. In position C connection 50 communicates with connection 55 and connection 57 communicates with connection 59.

Operation of the drive-transmitting arrangement in use as the gearbox of a motor vehicle will now be described. The drive shaft 2 is connected, directly or indirectly, to the output shaft of the vehicle engine (not shown) and the output shaft 3 is connected to the vehicle propellor shaft (not shown). When the vehicle is stationary with its engine idling, the relief valve 49 is fully open, allowing hydraulic fluid to be pumped freely along lines 56 and 48, the overdrive valve 51 is in position A and the reversing mechanism 25 is in neutral condition. When it is intended that the vehicle should move forwards, the selector rod 38 is moved in the direction of the arrow F. At this stage the carriage 6 is held stationary by virtue of its mechanical connection with the output shaft 3 via the shaft 23 and reversing mechanism 25. Assuming that the drive shaft 2 is being driven by the engine in a clockwise direction when viewed from the drive end, the pump 9 rotates in an anticlockwise direction pumping hydraulic fluid through the open relief valve 49. The boost pump 58, driven by the engine, maintains a pressure of about 150 p.s.i. in the line 48, regulated by the boost-pressure relief valve 53.

The relief valve 49 is now progressively closed, producing a rising back pressure in the line 56 which results in an increasing reaction torque at the input shaft 8 of the pump 9. This reaction torque is transferred by the planet gears 5 to the carriage 6 and thence to the output shaft 3, causing the vehicle to accelerate away from rest. As the vehicle speed rises, the pump speed falls until, when the relief valve 49 is fully closed, the pump 9 is hydraulically locked stationary and the engine output is transferred directly to the output shaft 3. The overdrive condition may now be selected by moving the overdrive valve 51 to position C, as shown in FIG. 3. In this condition the output of the boost pump 58 is directed to the line 56, causing the pump 9 to motor in a clockwise direction, thereby increasing the speed of the carriage 6 and the output shaft 3. Of course, the overdrive ratio is dependent on the capacities of the pumps 9 and 58 and the ratio of the epicyclic gear assembly 4 to 7, and will have been chosen to suit the vehicle concerned.

With a view to ensuring that the most efficient drive condition is maintained under various operating conditions, an electronic control system is provided, as shown in FIG. 4. A tacho-generator 61 is provided which is responsive to the engine speed, e.g., the rate of rotation of the camshaft. The output of the tacho-generator 61 is in the form of an AC signal the amplitude of which is proportional to the engine speed. This AC signal is rectified by a bridge rectifier BR1 and smoothed by a capacitor C1 to provide a DC signal which is fed to an integrated circuit offset controlled inverter IC1, the purpose of the offset being to provide an r.p.m. drive threshold. The inverted DC signal is then applied to a summing amplifier IC2. A DC-excited vacuum transducer 62 provided on the engine induction manifold produces a DC signal dependent on manifold depression which is applied to a further offset controlled inverter IC3. The output of IC3 is fed to IC2 where the signals dependent on engine speed and manifold depression are summed. The summed signal at the output of IC2 is then applied to a circuit including transistors TR1, and TR3, which provides an output of 0 - 75V to a solenoid 63 which controls the pilot-operated pressure relief valve 49.

To control overdrive operation, the engine speed dependent signal from IC1 is applied also to the inverting input 64 of a differential amplifier IC4, while a portion of the solenoid drive signal is applied to the non-inverting input 65 of IC4. The resulting output signal is then applied to a variable level detector IC5 which has a large amount of hysteresis. The output of IC5 is then applied to a circuit including a transistor TR4 and a relay RL1, which circuit provides an output to a solenoid 66 controlling the overdrive valve 51.

A power supply 67 produces stabilized outputs of +90V, +12V, +9V and −9V for the control system from the vehicle electrical system. Although only essential features of the control circuit shown in FIG. 4 have been described in detail, operation of the circuit and component values will be readily apparent to one skilled in the art. The control system described is suitable for use with spark-ignition engines. However, for use with diesel engines, instead of the manifold depression transducer 62, a fuel-feed transducer will be utilized to produce a signal dependent on rate of fuel feed.

The effect of the control circuit may be more readily understood by reference to FIG. 5, in which four curves 68 to 71 of engine brake horse power plotted against engine speed are shown. Curve 68 is for a small throttle opening whilst curve 71 is for maximum throttle opening. For a given throttle setting, the circuit progressively closes the relief valve 49 as the vehicle accelerates until, at a point $\alpha 1$, $\alpha 2$, $\alpha 3$ or $\alpha 4$ the valve 49 is fully closed. The vehicle then continues to accelerate until a point $\beta_1$, $\beta_2$, $\beta_3$ or $\beta_4$ is reached, when the overdrive relay 51 is operated, engaging the overdrive condition and allowing the engine speed to fall to a point $\gamma_1$, $\gamma_2$, $\gamma_3$ or $\gamma_4$, at which the vehicle cruises. If, as a result of ascending an incline, the vehicle decelerates so as to cause the engine speed to fall appreciably below that given by points $\gamma_1$, $\gamma_2$, $\gamma_3$ or $\gamma_4$, the overdrive condition is disengaged to provide greater torque at the drive wheels. Similarly, if the vehicle throttle is opened, the overdrive condition is disengaged and, possibly, the relief valve is partially opened, allowing for rapid increase in engine speed and, therefore, available power.

For better high speed control, the control circuit may be adjusted so that the overdrive valve 51 is operated to engage the overdrive condition before the relief valve 49 is fully closed. This allows some of the output of the boost pump 58 to pass through the relief valve 49, thereby varying the fluid flow rate to the pump 9 and controlling the overdrive ratio. By utilizing a boost pump 58 having approximately the same capacity as the pump 9, a high overdrive ratio can be obtained, which permits economical cruising at low engine speed. Also in the interests of economy, it can be arranged for the relief valve 49 to be partially opened when the vehicle is operating in an overrun condition with the throttle closed, for instance when travelling downhill, to provide controlled free-wheeling. The pump 9 is then driven in a clockwise direction by the momentum of the vehicle and the engine is allowed to slow down. As soon as the throttle is opened, the engine speeds up and the drive or overdrive condition is restored.

The embodiment shown in FIG. 6 includes an input shaft 72 carrying a gear wheel 73 engaging with a further gear wheel 74 mounted on an annulus 75 of an epicyclic gear cluster 76. Planet gears 77 mounted on a carriage 78 mesh with the annulus 75 and also with a sun gear 79 carried on a shaft 80. The shaft 80 passes axially through a hollow shaft 81 of a hydraulic pump 82, a gear wheel 83 being mounted at the end of the shaft 81 adjacent the epicyclic gear cluster 76. An intermediate gear member 84 engages with the gear wheel 83 and also with a gear wheel 85 provided on the carriage 78, so that torque applied to the input shaft 72 is transmitted to the shafts 80 and 81 in much the same manner as has been described with reference to FIG. 1. Of course, arrangements of the input, pump and output around the epicyclic gear cluster other than those described with reference to FIGS. 1 and 6 are possible.

At the end of the shaft 80 away from the sun gear 79 there is provided a gear assembly 86 of conventional form, comprising epicyclic gear clusters 87, 88 and 89 cooperating with brake bands 90, 91 and 92 respectively. Any one of the brake bands 90, 91 and 92 may be engaged with its gear cluster 87, 88 or 89 to provide high ratio, low ratio or reverse drives, respectively, to an output shaft 93. The low ratio is used to obtain sufficient output torque for initial acceleration from rest and for ascending steep hills, and is comparable to second gear on a manual gearbox. A very low ratio is not normally required as the engine will be operating at a speed at which it produces its maximum torque, rather than little above tick-over speed as is the case with a manual gearbox. Instead of the high and low ratio gear clusters 87 and 88, a torque converter may usefully be employed. However, if a very low gear should be required, for example in a multi-purpose vehicle, an extra pair of reduction gears engageable by dog clutches may be provided.

FIG. 7 is a diagram showing the relationship between the speeds of the annulus 75, the carriage 78 and the sun gear 79 with a gear ratio of 2.6 : 1 between the annulus 75 and the sun gear 79. Engine speed is shown assuming a reduction of 4 : 1 from gear wheel 73 to gear wheel 74, and road speed is also shown, assuming a 4 : 1 rear axle ratio and 24 diameter wheels. The directions of rotation are as viewed from the input end of the assembly. Line 94 indicates the situation when the vehicle is stationary and the engine is running at 4000 r.p.m. clockwise, the carriage 78 running at approximately 720 r.p.m. anticlockwise. Line 95 shows as intermediate condition where reaction torque has slowed the carriage 78 and accelerated the sun gear 79 in the clockwise direction. The situation where the relief valve 49 is closed and the carriage 78 is hydraulically locked is indicated by line 96, the sun gear 79 rotating at 2600 r.p.m. Lines 97, 98 and 99 show overdrive conditions, where the pump 82 and hence the carriage 78 are being driven clockwise by the boost pump 58. The freewheel condition indicated by line 100, is one in which the carriage has been allowed to accelerate to approximately 1100 r.p.m clockwise whilst the annulus speed has fallen to 250 r.p.m.

The invention is particularly applicable to vehicles which embody hydraulic systems, for example stacker trucks, as the hydraulics of the drive system can then be integrated with the existing hydraulic system.

If the drive-transmitting arrangement is to be used in conjunction with industrial machinery, the control system described above will normally be replaced by a simple feedback system to maintain a preselected output speed regardless of load. However, if a very wide speed range is required, it may be desirable to have two such drive-transmitting arrangements operating in series. For very large machines, involving high starting inertias, a large hydraulic pump and/or an epicyclic two speed arrangement may be required for starting purposes, being replaced by a smaller pump through the intermediary of dog clutches once speed has been built up. Alternatively, a variable displacement pump such as a swashplate pump may be used, running at high displacement for starting and having the displacement reduced as speed builds up.

I claim:

1. A drive-transmitting arrangement comprising a gear assembly having an input member and two output members, wherein one of the output members is connected to the operating element of a hydraulic pump and valve means is provided in the outlet line of the hydraulic pump, which valve means is adjustable to adjust the resistance to movement of the operating element of the hydraulic pump and thereby to adjust the ratio between the rates of rotation of the input member and the other output member.

2. A drive-transmitting arrangement according to claim 1, wherein the side of the valve means away from the outlet of the hydraulic pump is connected to a reservoir to which the inlet side of the pump is connected.

3. A drive-transmitting arrangement according to claim 2, wherein the supply and delivery lines of the hydraulic pump are connected to a directional control valve.

4. A drive-transmitting arrangement according to claim 3, wherein a boost pump is provided between the directional control valve and the reservoir, the directional control valve being operable to direct the output of said boost pump to either side of said hydraulic pump.

5. A drive-transmitting arrangement according to claim 4, wherein said hydraulic pump is arranged to pump hydraulic fluid around a closed loop from which leakage is permitted, with topping-up effected by means of said boost pump when said directional control valve is in a first position.

6. A drive-transmitting arrangement according to claim 4, wherein when said directional control valve is in a second position the output of said boost pump is directed to the outlet side of said hydraulic pump to cause said hydraulic pump to act as a motor.

7. A drive-transmitting arrangement according to claim 1, including a reversing mechanism comprising an epicyclic gear assembly with selectably engageable dog clutches.

8. A drive-transmitting arrangement according to claim 1, wherein control means are provided for controlling the degree of opening and closing of the valve means.

9. A drive-transmitting arrangement according to claim 8, wherein the control means includes means for generating a first signal determined by a first engine parameter, for example the rate of rotation of the engine or the setting of a throttle controlling operation of the engine, means for generating a second signal determined by a second engine parameter, for example induction manifold depression or rate of feed of fuel, a summator to which said first and second signals are applied and means controlling the setting of the valve means in dependence on the output of the summator.

10. A drive-transmitting arrangement according to claim 3, wherein control means are provided for controlling the position of the directional control valve, said control means being automatically responsive to engine parameters.

11. A drive-transmitting arrangement comprising
1. a gear assembly having an input member and two output members,
2. a hydraulic pump having an operating element,
3. means connecting one of the output members to the operating element,
4. said pump having an outlet line containing controllable valve means, and
5. means controlling the setting of the valve means to vary the restriction to fluid flow along said outlet line so as to adjust the resistance to movement of the operating element of the pump and hence to adjust the ratio between the rates of rotation of the input member and the other output member.

12. A drive-transmitting arrangement according to claim 11, wherein the gear assembly is an epicyclic gear, the input member is the annulus of said epicyclic gear, the one output member is the sun gear and the other output member is connected to a carriage on which the planet gears are mounted.

13. A drive-transmitting arrangement according to claim 11, wherein the gear assembly is an epicyclic gear, the input member is the annulus of said epicyclic gear, the one output member is connected to a carriage on which the planet gears are mounted and the other output member is the sun gear.

* * * * *